Aug. 24, 1965 P. J. GINGRAS 3,202,753
GLASS TO CERAMIC TO METAL SEAL
Filed Aug. 13, 1963

INVENTOR
PAUL J. GINGRAS
BY David S. Fishman
ATTORNEY

United States Patent Office 3,202,753
Patented Aug. 24, 1965

3,202,753
GLASS TO CERAMIC TO METAL SEAL
Paul J. Gingras, Vernon, Conn., assignor to United Aircraft Corporation, East Hartford, Conn., a corporation of Delaware
Filed Aug. 13, 1963, Ser. No. 301,767
7 Claims. (Cl. 174—50.58)

This invention relates to a novel leak-tight electrode holder and seal. More particularly, this invention relates to a novel leak-tight electrode holder and seal of wide application, especially in high temperature operation, corrosive environments and in high electrical current systems. However, it is to be expressly understood that this invention is an improvement in the electrical tube art in general.

The present invention eliminates the problems of differential expansion between metallic electrodes and glass envelopes through which they pass and the poor corrosive resistance of present oxide seals. In the present invention an annular ceramic element is joined at one end to a glass tube envelope by a fused glass seal, the ceramic and glass having substantially the same coefficients of thermal expansion in the area of the seal. The annular ceramic element is joined at the other end to a metallic end cap through which the electrical lead passes to be introduced into the glass tube envelope. Problems of corrosion resistance are eliminated since there is no seal in the system to an oxide film on an electrode, and the size and current carrying capacity of the electrode is not limited by differential expansion of the glass and the electrode.

Accordingly, one object of the present invention is to produce a novel electrode holder and seal which can accommodate a larger current carrying electrode than heretofore possible.

Another object of the present invention is to produce an electrode holder and seal which is highly resistant to corrosive environments.

Other objects and advantages will be apparent from the specification and claims, and from the accompanying drawings which illustrate an embodiment of the invention.

Figure 1:
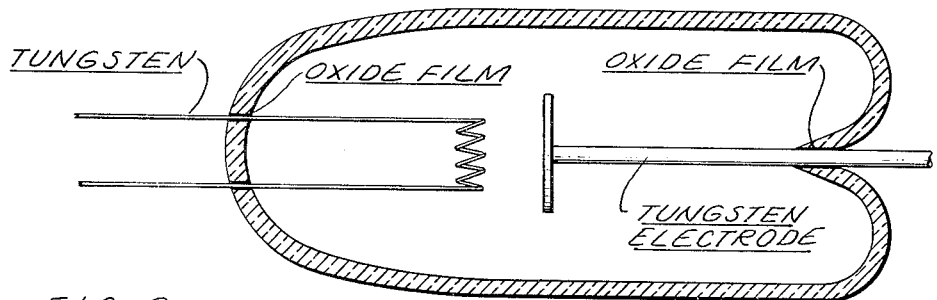
FIGS. 1, 2 and 3 show prior art electrode holder and seal arrangements.

The prior art device shown in FIG. 1 is a typical glass-to-metal electrode seal in which a tungsten electrode passes through and is bonded to a glass tube envelope. The glass is bonded to an oxide on the tungsten surface. In this type of seal the metal electrical lead and hence the current capacity is limited in size to approximately 1/8″ diameter due to the difference in the thermal expansion coefficients between commercially available glasses and various metals used for the electrodes. Also, since the bond in this type of seal is achieved by sealing glass to the oxide film on the surface of the metal electrode, this type of seal is severely attacked at the metal oxide joint in corrosive environments either inside or outside of the tube.

Figure 2:
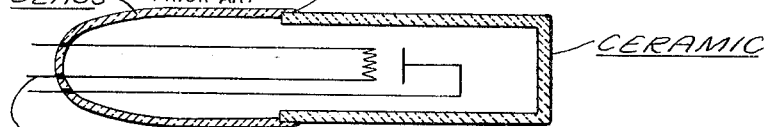

The prior art device in FIG. 2 shows a type of electrical tube in which the tube envelope consists of a glass portion joined to a ceramic portion by a fused glass seal. However, the electrodes must be introduced into the envelope through the glass in the same manner and with the same shortcomings as the system shown in FIG. 1.

Figure 3:
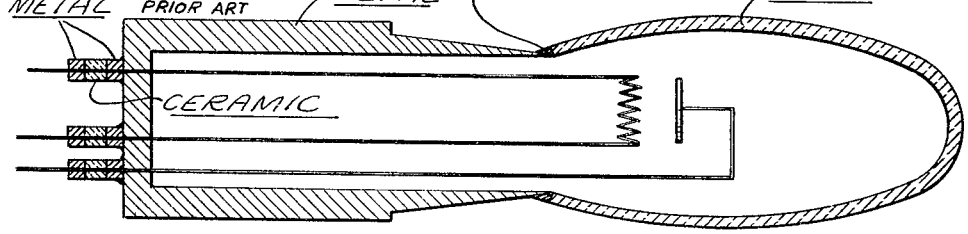

The prior art structure shown in FIG. 3 is a glass-to-metal seal which is known as a Housekeeper seal. With this type of seal larger electrical leads can be introduced into the glass envelope since the problem of differential expansion coefficients between metal and glass is partly reduced by making the metal joint very thin. The thin metal is joined to the glass by an oxide film on the metal surface. This type of construction allows the metal in the seal area to flex to compensate for the different expansion rates between the metal and the glass, but the oxide coating limits corrosion resistance and the seal is prone to failure due to high stress concentrations in the seal area. The electrodes are introduced into this environment through a metal-to-ceramic-to-metal element which is welded or brazed to the metal Housekeeper unit. It should be noted that the Housekeeper seal is an extremely costly element.

Figure 4:
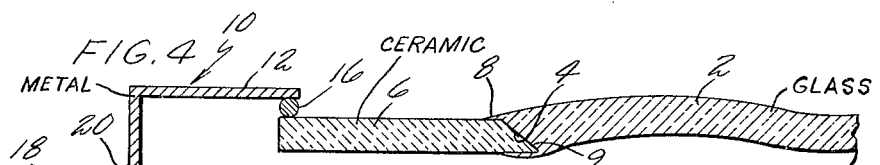
FIG. 4 shows the details of the electrode holder and seal of the present invention.

The details of the leak-tight electrode holder and seal of the present invention are shown in FIG. 4. The glass envelope or tube 2 into which one or more electrodes is to be introduced has an opening 4. A high density ceramic element 6 of annular cross section, such as 85% aluminum oxide, is butted against or fits within the opening in tube 2 and is joined to the tube by a fused glass seal 8. The end 9 of ceramic element 6 is chamfered at the seal location to prevent large heat transfer to the main body of ceramic when the fused seal is being made. The other end of annular ceramic element 6 is joined to a metallic end cap 10 having an annular skirt 12 and a closure end piece 14. End cap 10 is joined to the other end of ceramic element 6 by brazed material 16. The electrode 18 to be introduced into tube or envelope 2 passes through opening 20 in the end piece 14 of end cap 10 and thence through the center opening in ceramic element 6 and into the tube or envelope 2 to form part of an electrical circuit, the electrode being welded or brazed at 22 to completely seal opening 20. Of course, ceramic element 6 could be in the form of a disc with a number of holes therethrough for passage of electrodes into the tube with a number of metal end caps joined to the disc, one at each hole.

The weld 22, the braze 16, and the fused glass seal 8 make the entire structure leakproof so that neither ambient air can get into nor a gas atmosphere can get out of the envelope in the area in which the electrode is introduced into the envelope.

As shown in FIG. 4, the leak-tight electrode holder and seal has a fused glass-to-ceramic joint. The glass and ceramic are selected to have closely matching coefficients of thermal expansion, the coefficients of expansion of the glass and ceramic preferably not differing by more than 15% of each other. By way of example, if the ceramic element is high density (85%) aluminum oxide, the glass for the tube or envelope could be a grading glass made up of borosilicates such as Corning 7052 bonded to the ceramic and merging into Corning 3320 which then merges into Corning 7740; or, if Mullite is used as the ceramic, then the Mullite can be bonded directly to Corning 7740 glass. As can be seen in FIG. 4, the joint between the ceramic and the glass does not depend on a thin metal surface oxide to achieve a seal and the structure need not be thinned by costly machining in the area of the joint. Therefore, the major objections to the prior art techniques, i.e., high stress concentrations in the glass portion of the seal and thin metal oxide film joints are eliminated. The other end of the annular ceramic element is brazed to the metallic end cap 10 which can be any common metal consistent with corrosion resistance and high vacuum technology such as stainless steel nickel "Monel," a registered trademark, or copper. It should also be noted that a composite ceramic graded from ceramic to metal could be used which would eliminate the need for braze material in the ceramic-to-metal portion of the seal.

Great flexibility is achieved with the seal and electrode holder shown in FIG. 4. The metal-to-glass seals of the prior art were severely limited in electrical current capacity (approximately 20 amps being the maximum limit) due to resistive heating losses in the tungsten causing nonuniform heating of the seal area in the high stress concentration regions. With the leak-tight electrode holder and seal of the present invention, the current carrying wire 18 is not limited to tungsten, and its size is not limited. The electrode can operate at current levels involving temperatures close to the melting temperature of the braze material used in the ceramic-to-metal seal; or, fluid cooling could be introduced to reduce the seal temperature or for cooling of internal tube parts.

One of the limitations presently encountered in using alkali metal atmospheres in glass power tubes for space charge neutralization is the corrosiveness of the alkali metals on the oxides present in the metal-to-glass seal. The leak-tight electrode holder and seal of the present invention eliminates this problem since no oxide film is involved in sealing.

Figure 5:
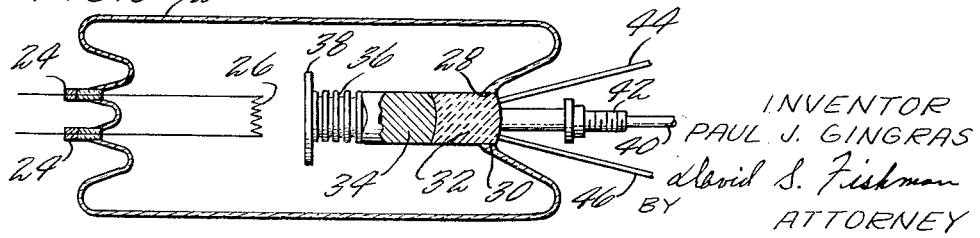
FIG. 5 shows a tube system incorporating the electrode holder and seal of the present invention.

Referring now to FIG. 5, the electrode holder and seal shown in detail in FIG. 4 is shown in two exemplary embodiments. The glass envelope 2 of the tube could be of the graded glass type described above and would be joined by fused glass seals to two electrode holder and seal units 24 corresponding to the electrode holder and seal unit shown in detail in FIG. 4. The electrode leads introduced into the interior of tube 2 through electrode holders and seals 24 form the leads for cathode 26. Inserted into an opening 28 in the other end of tube 2 is another embodiment of the electrode holder and seal of the present invention. The glass is joined by fused glass seal 30 to an annular ceramic element 32 corresponding to the element 6 of FIG. 4 and which extends into the interior of envelope 2. An annular metal skirt 34 corresponding to skirt 12 of FIG. 4 is brazed to ceramic element 32, and a bellows 36 is brazed or welded to skirt 34 and carries tube anode 38. Electrode 40 is connected to anode 38, and an adjusting element such as screw 42 can be used to vary the position of anode 38 with respect to cathode 26. In addition, a cooling fluid can be circulated through the interior of the entire holder and seal element via inlet conduit 44 and outlet conduit 46.

The structure shown in FIG. 5 is merely intended to be illustrative of possible embodiments of the electrode holder and seal of the present invention. The anode holder of FIG. 5 shows that the electrode holder and seal of the present invention is not limited in size, can support numerous assemblies which can be varied in position either inside or outside the tube envelope and can accommodate auxiliary functions such as cooling. Thus, the electrode holder and seal of the present invention results ing greater flexibility than was heretofore achieved in the prior art systems.

It is to be understood that the invention is not limited to the specific embodiment herein illustrated and described but may be used in other ways without departure from its spirit as defined by the following claims.

I claim:

1. A seal system including a glass envelope into which a metal lead is to be introduced, said glass envelope having an opening therein, a ceramic element having a passage therethrough leading into said envelope, said ceramic element being joined at one end to said glass element at the opening therein by a fused glass seal, a metallic end cap connected to said ceramic element at the other end thereof, and a metallic lead hermetically sealed to said end cap and passing through said end cap and the passage in said ceramic element into said glass envelope.

2. A seal system as in claim 1 wherein the coefficient of thermal expansion of said glass envelope and the coefficient of thermal expansion of said ceramic element are substantially equal at the junction between said glass envelope and said ceramic element.

3. A seal system as in claim 1 wherein the coefficient of thermal expansion of said glass envelope and the coefficient of thermal expansion of said ceramic element are matched to within 15% of each other at the junction between said glass envelope and said ceramic element.

4. A seal system as in claim 1 wherein said ceramic element is annular in cross section.

5. An electrode holder and seal system including a glass envelope into which an electrode is to be introduced, said envelope having an opening therein, an annular ceramic element having a cross section corresponding in shape to the opening in said glass envelope, one end of said annular ceramic element being joined to said glass envelope at the opening therein by a fused glass seal, an annular metallic skirt having a cross section corresponding to said annular ceramic element, said annular metallic skirt being connected to said annular ceramic element at the other end of said ceramic element, a metallic end piece connected to said annular skirt for closing the end of said metallic skirt removed from said ceramic element, and a metallic electrode hermetically sealed to said end piece and passing through said end piece, said metallic skirt and said ceramic element into said glass envelope.

6. A seal system as in claim 5 wherein the coefficient of thermal expansion of said glass envelope and the coefficient of thermal expansion of said ceramic element are substantially equal at the junction between said glass envelope and said ceramic element.

7. A seal system as in claim 5 wherein the coefficient of thermal expansion of said glass envelope and the coefficient of thermal expansion of said ceramic element are matched to within 15% of each other at the junction between said glass envelope and said ceramic element.

References Cited by the Examiner

UNITED STATES PATENTS

| 2,170,648 | 8/39 | Baier et al. | 174—50.61 X |
| 2,204,217 | 6/40 | Herriger. | |
| 2,667,427 | 1/54 | Nolte. | |
| 3,065,533 | 11/62 | Dungan et al. | 189—36 X |

FOREIGN PATENTS

| 701,054 | 12/40 | Germany. |
| 424,442 | 2/35 | Great Britain. |

OTHER REFERENCES

Fused Vacuum Tight, Ceramic to Glass, Sealing by Powdered Glass Techniques, Ceramic Age Magazine, June 1954, pp. 15–19.

JOHN F. BURNS, *Primary Examiner.*

DARRELL L. CLAY, *Examiner.*